Aug. 10, 1965  R. K. E. WHITAKER  3,199,962
METHOD OF COUNTERCURRENT CONTACTING OF IMMISCIBLE FLUIDS
Filed March 7, 1960  2 Sheets-Sheet 1

INVENTOR.
Robert K.E. Whitaker
BY
Albright Arnold
ATTORNEY.

Aug. 10, 1965   R. K. E. WHITAKER   3,199,962
METHOD OF COUNTERCURRENT CONTACTING OF IMMISCIBLE FLUIDS
Filed March 7, 1960
2 Sheets-Sheet 2

INVENTOR.
Robert K. E. Whitaker
BY
*[signature]*
ATTORNEY

United States Patent Office 3,199,962
Patented Aug. 10, 1965

3,199,962
METHOD OF COUNTERCURRENT CONTACTING OF IMMISCIBLE FLUIDS
Robert K. E. Whitaker, 14 Saddington St., Turramurra, New South Wales, Australia
Filed Mar. 7, 1960, Ser. No. 13,210
4 Claims. (Cl. 23—310)

My invention relates to a method and means for contacting flowing materials for stripping purposes.

A primary and fundamental object of my invention is to make a stripping column efficient, and in doing this I introduce the fluid to the liquid, so that it may take on portions thereof; then withdraw the fluid from the same to remove such acquired portion of liquid; and then reintroduce the fluid to another portion of the liquid. This is done repeatedly in stages, thereby providing for an efficient stripping column.

An object of my invention is to provide an improved and highly efficient method of and means for bringing about stripping contact of two materials, such as two fluids of different phase, flowing in different directions.

Another object is to provide stripping tower devices of highly efficient construction by which a heavier fluid and a lighter fluid can be effectively subjected to counter-current contact for stripping purposes.

Another object is to provide an efficient method of and apparatus for counter-current contacting a heavier phase fluid or liquid and a lighter phase fluid, such as a gas or vapor, by intermittently bringing the two fluid phases into close contact with each other, then separating or disengaging said two fluid phases and regenerating, restoring or reconditioning the lighter phase by extracting entrained heavier phase fluid therefrom and again bringing the two fluid phases together for stripping and repeating these steps.

Another object is to provide a stripping tower having an interrupted helical runway over which a heavier phase fluid is caused to flow and having, at intervals in said runway, means for redistributing the heavier phase fluid over the runway.

Another object is to provide a stripping tower in which provision is made for imparting turbulence to each of two different fluids which are caused to contact each other.

Another object is to provide a stripping tower which is simple in construction thereby facilitating a rational approach to design problems and making possible economics in the manufacture of the same.

The above mentioned general objects of the invention, together with others inherent in the same, are attained by the mechanism illustrated in the accompanying drawings, throughout which like reference numerals indicate like parts:

In a general way my invention comprises an arrangement of parts within a vertical cylindrical tower to be used for two phase counter-current contacting, such as is at present used in the arts of vapor-liquid absorption, distillation, rectification, stripping and drying and the like. Present equipment used for this art comprises generally either towers filled with various types of packing, such as bricks, Raschig rings, Berle saddles, etc., or trays, such as bubble cap trays, sieve trays, side to side pans, and cascade type trays.

Figure 1:
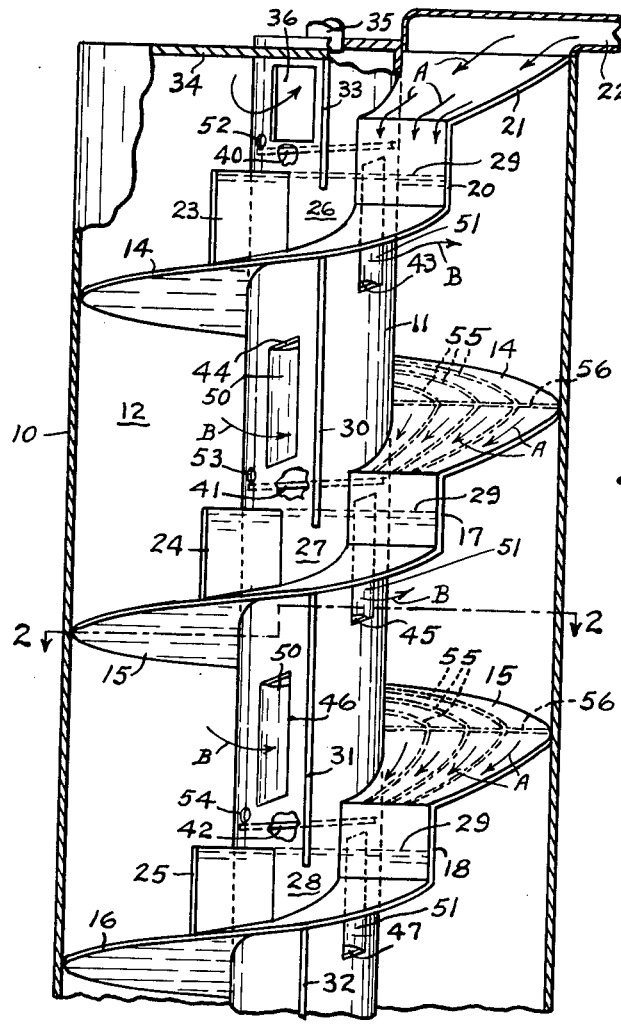
FIGURE 1 is a fragmentary view partly in vertical section and partly in elevation showing a stripping column constructed in accordance with my invention.
Figure 3:
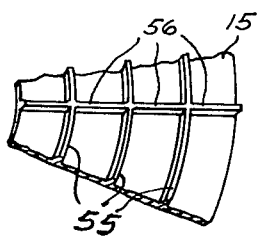
FIG. 3 is a fragmentary detached perspective view illustrating the construction of a helical runway embodied in the invention.
Figure 2:
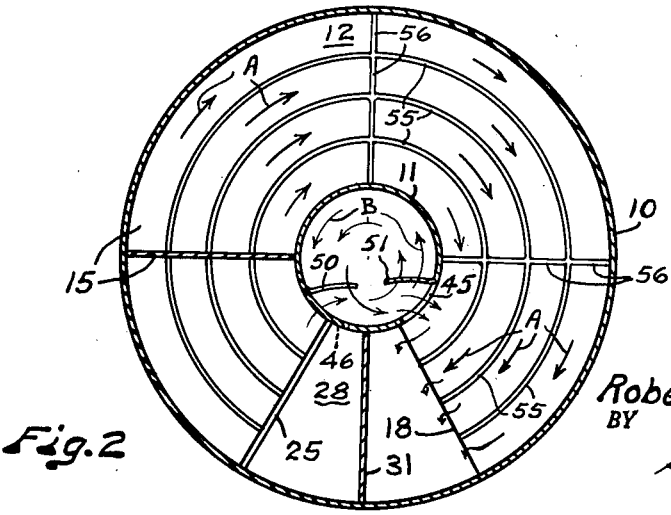
FIG. 2 is a cross sectional view of the same taken substantially on broken line 2—2 of FIG. 1.

The embodiment of my invention shown in FIGS. 1, 2 and 3 comprises an upright tubular outer shell or column 10 of fairly large diameter, within which is an upright tubular inner shell or column 11 of substantially smaller diameter than the column 10. The two columns 10 and 11 cooperate in forming therebetween a treatment chamber 12 wherein counter-current contacting of fluids may be brought about. It will be understood that the columns 10 and 11 may be of any desired length.

An interrupted helical runway, which may comprise any desired number of stages or sections, is disposed within the treatment chamber 12 between the outer column 10 and inner column 11. Three helical sections 14, 15 and 16 of this runway are shown in FIG. 1, by way of example. The uppermost helical runway section 14 is connected with the runway section 15 next below it by an upright riser or step 17. The runway section 15 has its lower end connected with the upper end of the runway 16 next below it by a riser or step 18, and any desired number of similarly connected sections therebelow are provided, depending on requirements.

The uppermost end of the upper helical runway section 14 can be connected by a riser or step 20 with a short runway section 21 onto which material capable of flowing, such as a liquid, can be delivered from a conduit 22. This liquid flows downwardly, as indicated by arrows A, from inlet means 21, 22 and over runway sections 14, 15 and 16.

Upright weir plates 23, 24 and 25 are provided on the respective runway sections 14, 15 and 16 in spaced relation, in a downward direction, from the steps 20, 17 and 18, respectively. The weir plates 23, 24 and 25 function as dams and cooperate with other parts in forming traps 26, 27 and 28 wherein liquid can collect to a depth sufficient to overflow the weir plates, as indicated by dash lines 29.

Upright vapor seal plates 30, 31 and 32 extend from the respective runways 14, 15 and 16 downwardly, a fragment only of seal plate 32 being shown. The vapor seal plates 30 and 31 are positioned above the respective traps 27 and 28, and the lower edges of these seal plates 30 and 31 extend below the level of the upper edges of the respective weir plates 24 and 25 and into the respective traps 27 and 28. When the traps 27 and 28 contain liquid above the level of the lowermost edges of the respective seal plates 30 and 31, this liquid will form a seal by rising around the lower end portions of the seal plates and each seal plate will form a partition in the treatment chamber 12 between two of the helical runway sections. The lower end of each seal plate is essentially spaced above the part of the runway directly below it, so that liquid can flow thereunder. The respective lateral edges of the seal plates contact the walls of the outer column 10 and inner column 11.

A shorter vapor seal partition 33 can be provided above the runway section 14 extending from the top 34 of the outer column 10 downwardly and terminating in the trap 26 with its lower end clear of the runway 14. The inner tubular column 11 preferably has a fluid outlet or draw-off conduit 35 connected with its upper end and further has an opening 36 in its wall a short distance below its upper end through which fluid from chamber 12 can enter inner column 11.

The inner tubular column 11 has spaced apart slightly inclined partitions 40, 41 and 42 therein, which divide it into compartments. These partitions 40, 41 and 42 are shown chiefly by dotted lines in FIG. 1. The partitions 40, 41, 42 and seal plates 30, 31, 32 divide the column into sections or stages. The wall of the inner tubular column 11 is provided with openings or ports 43, 44, 45, 46 and 47 through which ascending fluid can flow into and out of said column 11. In each section one opening or port, such as opening 44 or 46, is positioned below the other opening, such as 43 or 45, and the ascending lighter phase fluid enters the inner column 11 by way of the lowermost opening and leaves by way of the uppermost opening. Thus, between helical sections 15 and 16 the ascending lighter phase fluid, being stopped by seal plate 31, will by-pass said seal plate 31 by entering inner column 11 by way of opening 46 and leaving by way of opening 45. Obviously, there may be one or more inlet openings, such as 44 and 46, and one or more outlet openings, such as 43 and 45, in the inner column 11 for each stage or section.

A baffle or deflector plate 50, shown in FIG. 2, is provided in connection with each inlet opening, such as opening 46, and another baffle or deflector plate 51 is provided in connection with each upper opening, such as opening 45. Each lower deflector plate 50 retards the velocity and changes the direction of movement of the entering lighter phase fluid, and each upper baffle plate 51 deflects and changes the direction of movement of said fluid as it leaves the inner column 11. Lighter phase fluid, such as vapor or gas, is introduced into the lower end portion of the device under pressure and moves upwardly in contact with downwardly moving heavier phase fluid on the runway sections and spirals in the opposite direction from the downwardly moving heavier phase fluid. Each time the ascending lighter phase fluid encounters one of the seal plates, such as 31, it enters the inner column 11 through one of the lower openings, such as opening 46, is baffled by the baffle plate 50, swirls upwardly in the inner column 11, as indicated by arrows B, and is directed outwardly by the baffle plate 51. This baffling and swirling of the lighter phase fluid in the inner column 11 causes it to release entrained droplets of heavier phase fluid, thus regenerating the lighter phase fluid for the next stage of operation. The released heavier phase fluid collects in the bottom of the compartment and escapes through a drain opening, such as 52, 53 or 54 back onto the adjacent runway.

The runways 14, 15 and 16 can be smooth, but preferably the upper surfaces of said runways are provided with longitudinally extending spaced apart shallow ribs 55 and with transverse shallow ribs or weirs 56. These ribs 55 and 56 are illustrated diagrammatically by dot and dash lines in FIGS. 1 and 2 and are shown more in detail in FIG. 3. The longitudinal ribs 55 guide and evenly distribute the ascending heavier phase fluid and prevent parts of the runways from running dry, and the transverse ribs or weirs are useful to impart turbulence particularly when only a shallow layer of liquid is flowing on the runway. Obviously either the longitudinal ribs 55 or the transverse ribs 56 can be used and the other ribs can be omitted from the runways. Preferably the velocity of the lighter ascending fluid is high enough to insure turbulence of this fluid, particularly at the interface where the two countercurrent fluids are in contact with each other.

Figure 4:
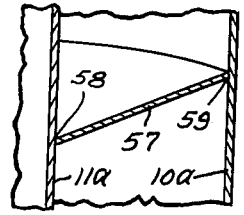
FIG. 4 is a fragmentary sectional view with parts in elevation showing a modified form of my invention having a helical runway which is inclined to counteract the centrifugal force of material flowing thereon.

FIG. 4 shows, fragmentarily, an embodiment of my invention in which the sections of a helical runway 58, between an outer tubular column 10a and an inner tubular column 11a, are inclined relative to the horizontal or have a downward pitch inwardly considered, so that, in any radial plane of the columns 10a and 11a, the inner edge 58 of the runway 57 is at a lower level than the outer edge 59 of said runway. This counteracts or minimizes the effect of centrifugal force and helps to maintain a uniform depth of liquid flowing on said runway, depending on the pitch of the runway and velocity of the flowing liquid. The structure shown in FIG. 4 is otherwise similar to that shown in FIG. 1.

Figure 5:
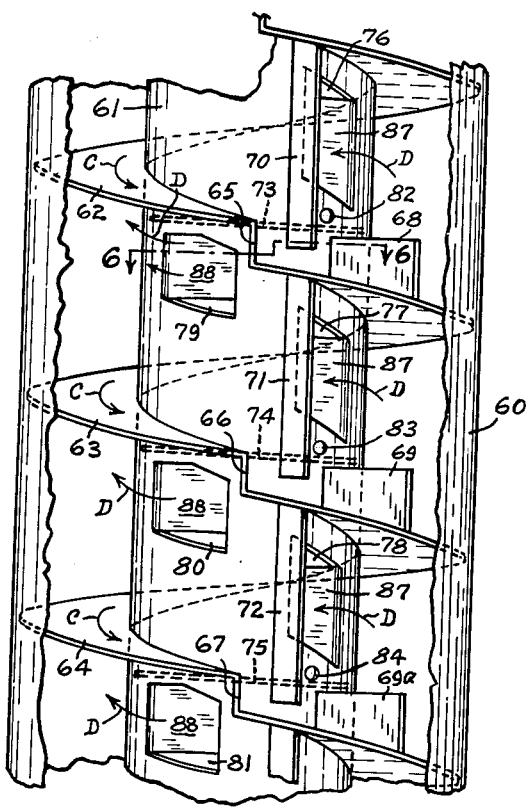
FIG. 5 is a view partly in section and partly in elevation showing a modified form of my invention in which the parts are differently proportioned from those shown in FIG. 1 and the pitch of the helical runway is opposite in direction and different in degree from that shown in FIG. 1.
Figure 6:
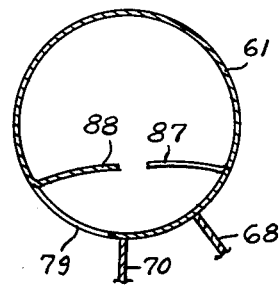
FIG. 6 is a cross sectional view taken substantially on broken line 6—6 of FIG. 5.

FIGS. 5 and 6 show an embodiment of my invention comprising a larger upright tubular outer column 60 and a smaller upright centrally positioned inner column 61. An interrupted helical runway composed of a plurality of sections, such as sections 62, 63 and 64, is provided in the space between columns 60 and 61. The sections 62, 63 and 64 are connected with each other by steps 65, 66 and 67. Numerals 68, 69 and 69a indicate weir plates, and 70, 71 and 72 seal plates, corresponding to the previously described weir plates and seal plates of FIG. 1. Numerals 73, 74 and 75 indicate spaced apart, slightly inclined, transverse partitions in the inner column 61. Numerals 76, 77 and 78 indicate fluid inlet openings in the wall of the inner column 61 positioned a short distance above the respective transverse partitions 73, 74 and 75 and near one side of the respective weir plates 68, 69 and 69a. Numerals 79, 80 and 81 indicate fluid outlet openings in the wall of inner column 61 near the other sides of the weir plates 68, 69 and 69a, and each positioned at a higher elevation than the fluid inlet opening with which it is paired. A baffle member 87 is provided within column 61 in connection with each fluid inlet opening 76, 77 and 78, and a corresponding baffle member 88 is provided in connection with each fluid outlet opening 79, 80 and 81. These baffle members 87 and 88 function similarly to the previously described baffle members 50 and 51 of FIGS. 1 and 2 in causing lighter phase fluid to follow a course as indicated by arrows D. The arrows C indicate the direction of flow of heavier phase fluid on runway sections 62, 63 and 64. Said runway sections 62, 63 and 64 are shown smooth, but they can be provided with ribs or ridges similar to previously described ribs 55 and 56. Drain holes 82, 83 and 84, similar to previously described drain holes 52, 53 and 54, are provided in the wall of column 61 close to but above the respective partitions 73, 74 and 75.

The helical runways 62, 63 and 64, shown in FIG. 5, spiral in the opposite direction from the runways shown in FIG. 1 and their pitch is substantially less than the pitch of the runways shown in FIG. 1. This reduced pitch provides for a slower speed of the descending liquid carried by the runways. Also, the diameter ratio of the two columns 60 and 61 of FIG. 5 differs from the diameter ratio of the two columns 10 and 11 shown in FIG. 1, the inner column 61 of FIG. 5 being relatively larger. The operation of the structure shown in FIGS. 5 and 6 is similar to the operation of the structure shown in FIGS. 1 and 2.

By way of example, the helical runways 14, 15 and 16, shown in FIG. 1, and the corresponding runways 62, 63 and 64, shown in FIG. 5, are of equal length and each runway is substantially three hundred sixty degrees in extent. However, it will be understood that the length of these runways may be varied, that they may encompass an arc of more or less than three hundred sixty degrees and that all of the runways in an installation are not essentially duplicates. In designing apparatus made in accordance with my invention, it is desirable to make each runway long enough to carry the heavier phase fluid until this heavier phase needs to be redistributed and also long enough to guide and define the path of the lighter phase fluid until said lighter phase needs to be disengaged of entrained droplets of the heavier phase. Also, in design, the pitch of the helical runways should be as needed to keep the liquid or heavier phase flowing at a turbulent velocity. The cross-sectional area of the treatment chamber 12, FIG. 1, should be as needed to insure that the velocity of the vapor or lighter components is in the turbulent range or sufficient to minimize the thickness of any stagnant gas film on the interface without causing excessive entrainment. The size of the central column should be as needed to handle the flow of vapors without requiring an excessive height of step-down, and the height of step-down should be as needed to insure adequate head to force the rising vapors through the disengaging compartment in the inner column.

When constructed as herein described, my apparatus will effectively perform the functions heretofore performed by all sorts of packed towers, sieve-deck towers, bubble-cap deck towers and open towers, with a saving in column size to do the same job, and therefore with greater economy. It is further susceptible to a more rational approach to design problems.

My apparatus may be part of a petroleum fractionating column, with liquid reflux entering at the top and flowing down, and reboiler vapors supplied to the bottom and rising through the column. Or it may be used as an absorption column, with absorbing liquid entering at the top and flowing down, and with vapor entering at the bottom and lean gas leaving the top. With a change in proportions, it can be used for liquid extraction, the heavier of the two immiscible liquids entering at the top, the lighter being introduced at the bottom, and exchange of a mutually soluble component occurring throughout. It may be used also in the contracting of fluids or gases with fine granular solids, the latter, if free-flowing, comprising the denser phase.

In all cases the heavier phase flows downward along the helical runway. It may be in a thin film or a heavy, fairly deep current of liquid. It is advisable that the pitch or slope be such that the flow is turbulent in nature and of a fairly high velocity. Below each step this liquid accumulates behind the weir plate and overflows said plate. An important function of each weir plate is to redistribute the liquid evenly for the next stage downward. The vapors or lighter phase, indicated by arrows B in FIG. 1, rise through the column and follow the helical runway in reverse until, at each stage, they reach the vapor seal plate which dips into the liquid in the trap above the adjacent weir plate and are caused to enter the inner column. The diameters of the two columns and the spacing and pitch of the helical runways—and thus the cross-sectional area for passage of gas or lighter phase fluid—are preferably so sized that the velocity of the lighter phase fluid will be high and well into the turbulent region. This tends to keep the stagnant gas film thickness at the interface at a minimum and thus facilitates the transmission of heat and material components. This is an important part of my invention. All previous methods of accomplishing this exchange, with which I am familiar, operate with substantially streamline or laminar flow at the point of heat or material exchange. With my device I expect to get some entrainment of the liquid or heavy phase which is carried upward and backward. The central column is therefore used as a disengaging area. The vapor, being barred from continuing its spiral path upward by the vertical vapor seal plate dipping into the liquid behind the weir, is changed in direction and enters the central column, where its direction is changed again. It is forced to follow a swirling path upward and finally is forced out into the spiral of the next stage up. At each point where its direction and velocity are changed there is a tendency to throw out liquid droplets which return downward to reenter the liquid stream. The dimensions of the central column and the lighter phase inlet and outlet holes therein are determined by the amount of vapor to be handled and by the pressure drop that can be tolerated. A small central column and small inlet and outlet holes will make for efficient disengaging but will provide a high pressure drop, and this in turn will set the minimum amount of drop to be made by the step-down, lest the excessive pressure drop back the liquid up and prevent it from dropping down the tower. A second function of the structure at the location of each step, therefore, is to provide sufficient head to operate the vapor disengaging devices. The function of the central column is to provide a series of vapor disengaging chambers, one for each step-down or stage.

Some of the advantages which accrue from my design are: It makes possible greatly increased throughput from a column of a given diameter or, conversely, it makes possible economies in building new columns for a given capacity; and it makes possible a completely rational approach, with great flexibility, to any problem involving the contacting of two materials, such as a liquid or material capable of flowing and a vapor or gas.

While there has been described an embodiment of the invention, it is appreciated that changes may be made in the parts and their organization without departing from the inventive concept thereof. It is desired not to be limited to the particular embodiment illustrated, but to cover all modifications and arrangements which would be apparent to one skilled in the art and that come within the scope of the appended claims.

I claim:

1. The method of counter-current contacting of two immiscible fluids of different density, including a liquid and a vapor, for the purposes of accomplishing mass transfer between the phases, comprising, causing a heavy liquid to freely, openly flow over a substantial portion of the width of a helical path while circling a vertical tower of an outer and an inner tubular shell; dividing said helical path into superimposed mixing and extracting compartments by forming a dam by step and weir in said helical path; dividing the area above said helical path by interposing transversely and vertically a sealing plate with its bottom edge dipping into the dam of liquid; causing the lighter fluid to flow upwardly countercurrently under pressure in open contact periodically with said liquid at a velocity well within the range of turbulence to form a moisture laden fluid; providing for passing said moisture laden fluid from the mixing compartment into the inner shell; subjecting said moisture laden fluid to a baffling treatment to extract liquid from said fluid and then passing the fluid back into the mixing chamber to flow into the next mixing chamber above for repetition of the cycle of entering and exiting the inner shell.

2. The method of counter-current contacting of two immiscible fluids of different density, including a liquid and a vapor, for the purposes of accomplishing mass transfer between the phases, comprising, causing a heavy liquid to freely, openly flow over a substantial portion of the width of a helical path while circling a vertical tower of an outer and an inner tubular shell; dividing said helical path into superimposed mixing and extracting compartments by forming a dam by step and weir in said helical path; dividing the area above said helical path by interposing transversely and vertically a sealing plate with its bottom edge dipping into the dam of liquid; causing the lighter fluid to flow upwardly countercurrently under pressure in open contact periodically with said liquid at a velocity well within the range of turbulence to form a moisture laden fluid; providing for passing said moisture laden fluid from the mixing compartment into the inner shell; subjecting said moisture laden fluid to a baffling treatment to extract liquid from said fluid and then passing the fluid back into the mixing chamber to flow into the next mixing chamber above for repetition of the cycle of entering and exiting the inner shell; and periodically redistributing the liquid over the helical path in its downward flow thereby counteracting the centrifugal force of said liquid.

3. The method of counter-current contacting of two immiscible fluids of different density, including a liquid and a vapor, for the purposes of accomplishing mass transfer between the phases, comprising, causing a heavy liquid to freely, openly flow over a substantial portion of the width of a helical path while circling a vertical tower of an outer and an inner tubular shell; dividing said helical path into superimposed mixing and extracting compartments by forming a dam by step and weir in said helical path; dividing the area above said helical path by interposing transversely and vertically a sealing plate with its bottom edge dipping into the dam of liquid; causing the lighter fluid to flow upwardly countercurrently under pressure in open contact periodically with said liquid at a velocity well within the range of turbulence to form a moisture laden fluid; keeping the velocity of the of the lighter fluid high so it is adapted to keep stagnant gas film thickness at a minimum to facilitate transmission of heat and material components; providing for passing said moisture laden fluid from the mixing compartment into the inner shell; subjecting said moisture laden fluid to a baffling treatment to extract liquid from said fluid and then passing the fluid back into the mixing chamber to flow into the next mixing chamber above for repetition of the cycle of entering and exiting the inner shell.

4. In the method of counter-currently contacting two immiscible fluids of different density for the purpose of accomplishing mass transfer and heat transfer between the phases comprising causing a liquid and a lighter fluid to flow countercurrently, the liquid to flow downwardly in a stream in a helical path in a column of a tower having concentric outer and inner tubular shells which inner shell has superimposed transverse sections, each section having inlet and outlet openings; mixing the liquid and the lighter fluid while each is flowing; diverting the lighter fluid into the inner shell under centrifugal force by inserting dams in said helical path together with sealing plates extending from the underside of said helical path to dip into the liquid of said dam; and subject the lighter fluid to a baffling action in the inner shell to extract moisture therefrom; and causing the lighter fluid to enter and exit from said inner tube and rise to the section above.

References Cited by the Examiner
UNITED STATES PATENTS

| | | | |
|---|---|---|---|
| 841,674 | 1/07 | Dodge | 55—240 |
| 2,000,606 | 5/35 | Othmer | 23—270.5 |
| 2,133,819 | 10/38 | Howse | 55—241 X |
| 2,520,391 | 8/50 | Findlay | 23—270.5 X |
| 2,585,440 | 2/52 | Collins | 55—235 X |
| 2,587,416 | 2/52 | Vedder | 55—240 X |
| 2,652,316 | 9/53 | Williams | 23—270.5 |
| 2,767,068 | 10/56 | Maycock et al. | 23—310 |
| 2,778,717 | 1/57 | Decker | 23—310 |
| 2,820,700 | 1/58 | Saxton | 23—270.5 |
| 2,988,429 | 6/61 | Cooley | 23—270.5 |

FOREIGN PATENTS

| | | |
|---|---|---|
| 538,509 | 6/55 | Belgium. |
| 302,140 | 10/54 | Switzerland. |

NORMAN YUDKOFF, *Primary Examiner.*

JAMES H. TAYMAN, JR., MAURICE A. BRINDISI,
*Examiners.*